(12) United States Patent
Chen

(10) Patent No.: US 10,092,466 B1
(45) Date of Patent: Oct. 9, 2018

(54) SHOCK-ABSORBENT ANTI-TILT STRUCTURE OF ELECTRIC CARRIER

(71) Applicant: KUIANDA Company Limited, Kaohsiung (TW)

(72) Inventor: Mao-Chiang Chen, Kaohsiung (TW)

(73) Assignee: KUIANDA COMPANY LIMITED, Kaohsiung (TW)

( * ) Notice: Subject to any disclaimer, the term of this patent is extended or adjusted under 35 U.S.C. 154(b) by 0 days.

(21) Appl. No.: 15/597,888

(22) Filed: May 17, 2017

(51) Int. Cl.
| | |
|---|---|
| *A61G 5/10* | (2006.01) |
| *B62K 5/01* | (2013.01) |
| *B62K 25/04* | (2006.01) |

(52) U.S. Cl.
CPC .......... *A61G 5/1089* (2016.11); *A61G 5/1078* (2016.11); *B62K 5/01* (2013.01); *B62K 25/04* (2013.01); *B62K 2202/00* (2013.01)

(58) Field of Classification Search
CPC ...... A61G 5/1089; A61G 5/1078; B62K 5/01; B62K 25/04; B62K 2202/00
See application file for complete search history.

(56) References Cited

U.S. PATENT DOCUMENTS

| | | | | |
|---|---|---|---|---|
| 6,467,787 | B1 * | 10/2002 | Marsh | B62K 5/01 180/182 |
| 7,309,081 | B1 * | 12/2007 | Zuhlsdorf | B62K 5/01 280/6.154 |
| 7,866,671 | B2 * | 1/2011 | Madler | A01D 34/66 180/41 |

FOREIGN PATENT DOCUMENTS

TW    M341637 U    10/2008

* cited by examiner

*Primary Examiner* — Faye M Fleming
(74) *Attorney, Agent, or Firm* — Muncy, Geissler, Olds & Lowe, P.C.

(57) ABSTRACT

A shock-absorbent anti-tilt structure of an electric carrier coordinates with a steering system, which includes a steering axis and two sets of wheels. The shock-absorbent anti-tilt structure of an electric carrier includes a frame and an anti-tilt assembly. The frame includes a wheel axle, a first extension section pivotally connected to the wheel axle, a second extension section pivotally connected to the first extension section, and a bushing bridging the second extension section and the steering axis. The anti-tilt assembly includes two clamping members connected to the wheel axle and extending along the same direction as the first extension section, and two dampers respectively clamped by the clamping members and located closely to two sides of the first extension section. When the wheel axle receives a force and becomes unleveled with the ground, each of the dampers produces a reverse torque on the first extension section.

6 Claims, 5 Drawing Sheets

SHOCK-ABSORBENT ANTI-TILT STRUCTURE OF ELECTRIC CARRIER

FIELD OF THE INVENTION

The present invention relates to a shock-absorbent anti-tilt structure of an electric carrier, and particularly to a shock-absorbent anti-tilt structure of an electric carrier that achieves anti-tilt protection through an elastic element.

BACKGROUND OF THE INVENTION

In many developed countries, the social structure has progressed towards aging in the recent years, and the elderly frequently suffer from impaired physical mobility due to biological factors such as function aging or diseases. To provide the elderly with better mobility, various electric scooters have become available. With the coordination of barrier-free spaces, not only the living quality of the elderly is increased, but also burdens on caretakers are alleviated. Further, electric scooters provide the physical challenged with similar assistance.

A structure of a conventional electric scooter includes a vehicle housing, a seat, a motor and wheels. To prevent discomfort caused by bumpy road conditions while progressing, and to reduce the risk of tilting over of the scooter, an anti-tilt structure is usually installed at a wheel of the scooter. Thus, the level of tilting of the seat is reduced and better comfort is provided while one rides the scooter. For example, the Taiwan Patent Utility Model Patent M341637 discloses an anti-tilt structure of a conventional electric scooter. In the above disclosure, a sector gear, which engages with multiple motor gear groups, is disposed at a lower part of a seat. Further, a mercury switch is applied as a sensor that senses an angle of vibration, and a tilt angle is corrected using an electrically-controlled technology to achieve the object of anti-tilting. However, the above approach requires a highly sensitive stepping motor to precisely provide the adjustment force for correcting the seat, hence leading to higher costs. Further, if the change rate of the tilt angle exceeds a range that the stepping motor is capable of handling, an accident of the scooter tilting over may still be incurred. Therefore, there is a need for a solution for solving the above issues.

SUMMARY OF THE INVENTION

To achieve the above object, the present invention provides a shock-absorbent anti-tilt structure of an electric carrier. The shock-absorbent anti-tilt structure is coordinated with a steering system, which includes a steering axis and two sets of wheels linked with the steering axis. The shock-absorbent anti-tilt structure of an electric carrier includes a frame and an anti-tilt assembly. The frame includes a wheel axle connected to the two sets of wheels, a first extension section pivotally connected to the wheel axle and extending towards a direction parallel with the ground, a second extension section pivotally connected to the first extension section, and a bushing bridging the second extension section and the steering axis. A gripper pattern is formed one side opposite a pivotal joint of the first extension section and the second extension section. The anti-tilt assembly includes two clamping members connected to the wheel axle and extending along the same direction as the first extension section, and two dampers respectively clamped by the clamping members and located closely to two sides of the first extension section. When the wheel axle receives a torque and becomes non-parallel to the ground, each of the dampers produces a reverse torque on the first extension section.

Further, an axis line of the steering axis corresponds to a middle part of wheel axle.

Further, the shock-absorbent anti-tilt structure of an electric carrier further includes a shock absorbent, which is disposed between the steering axis and the wheel axle and corresponding to the gripper pattern formed by the first extension section and the second extension section. When the second extension section receives a force and moves towards the wheel axle, the shock absorber produces a counteracting force on the second extension section.

Further, the shock absorber is made of polyurethane.

Further, an included angle between the steering axis and the wheel axle is between 75° and 88°.

Further, the dampers are made of polyurethane, and respectively press tightly against two sides of the first extension section.

DETAILED DESCRIPTION OF THE PREFERRED EMBODIMENTS

Figure 1:
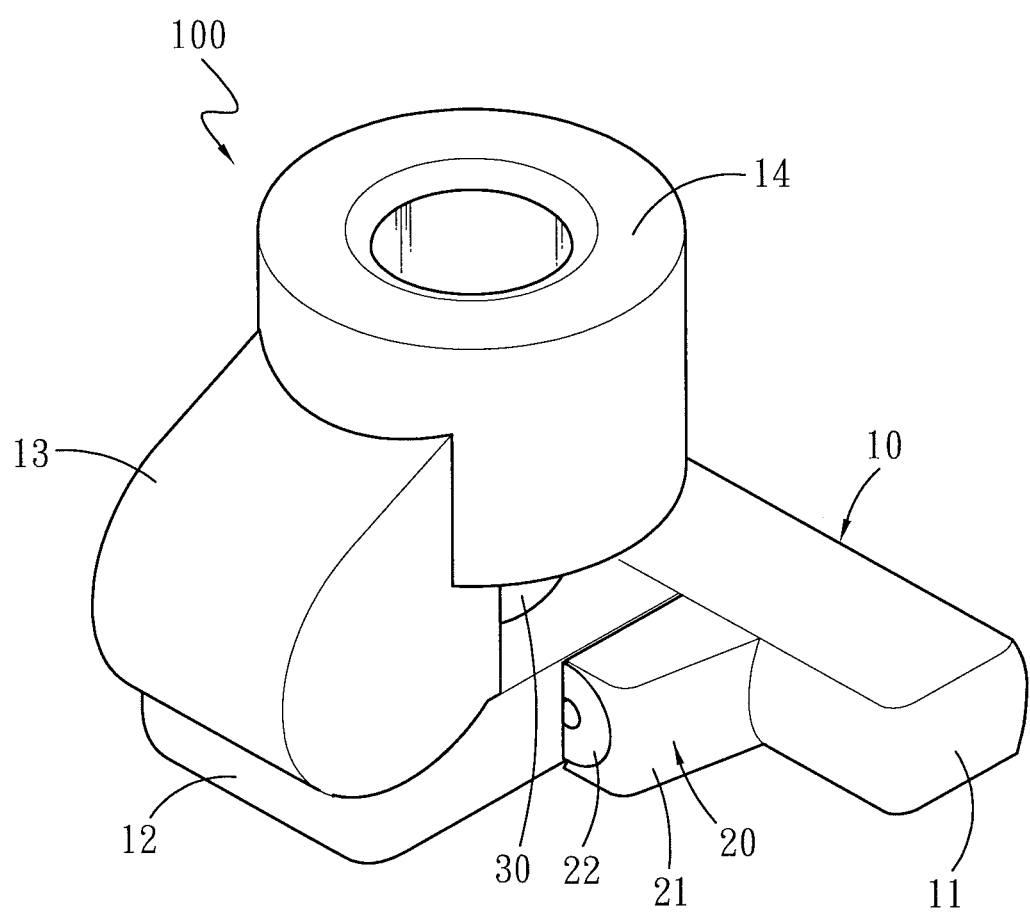
FIG. 1 is a perspective diagram of an anti-tilt structure of an electric carrier of the present invention.
Figure 2:
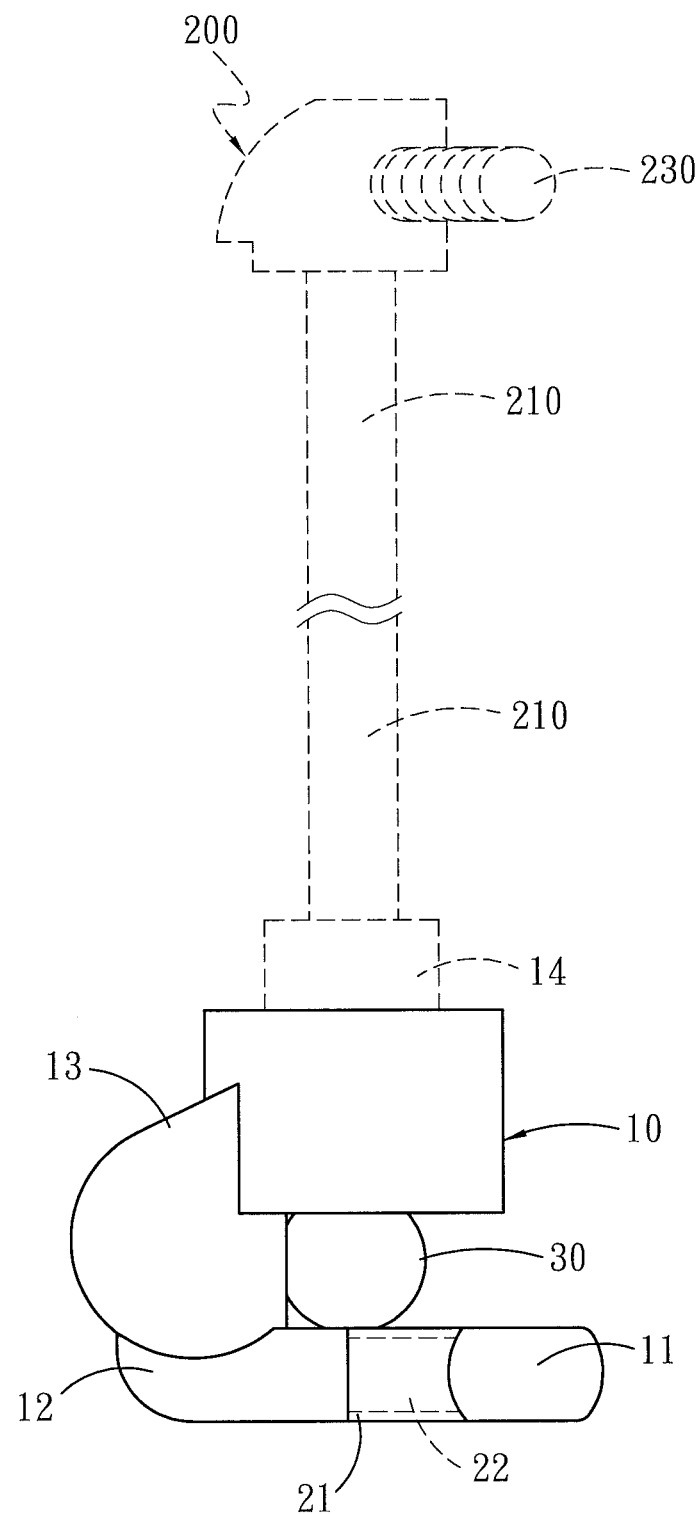
FIG. 2 is a side view according to a first embodiment of the present invention.

Referring to FIG. 1 and FIG. 2, the present invention provides a shock-absorbent anti-tilt structure 100 of an electric carrier. The shock-absorbent anti-tilt structure 100 coordinates with a steering system 200, which includes a steering axis 210 and two sets of wheels 220 linked with the steering axis 210. The shock-absorbent anti-tilt structure 100 of an electric carrier includes a frame 10 and an anti-tilt assembly 20. The steering system 200 is formed by components including a steering wheel 230, a steering arm (not shown) and a connecting bar (not shown). The steering axis 210 is a shaft linked with the steering wheel 230. Details of a steering system and a suspension system of a motorized vehicle are generally known to one person skilled in the art, and shall be omitted herein.

Figure 4:
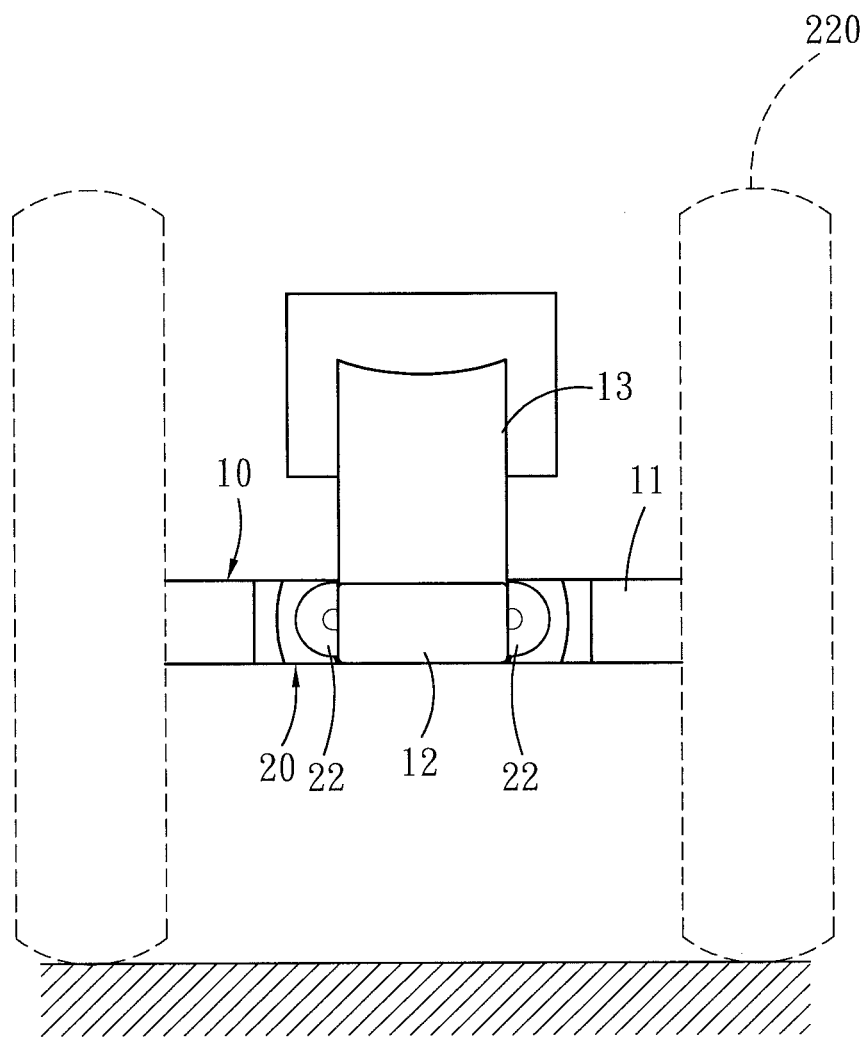
FIG. 4 is a planar view according to the first embodiment of the present invention.
Figure 5:
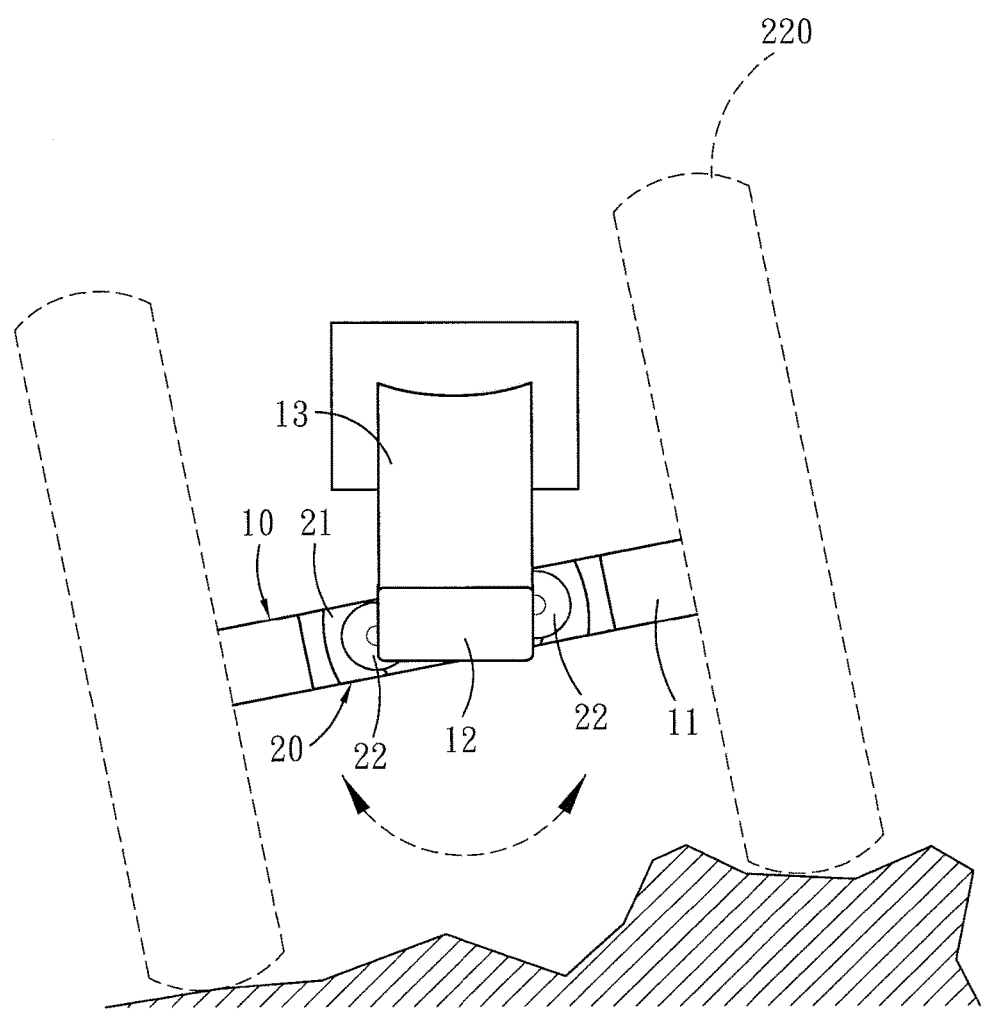
FIG. 5 is another schematic diagram of an operation according to the first embodiment of the present invention.

More specifically, the frame 10 includes a wheel axle 11 connected to the two sets of wheels 220, a first extension section 12 pivotally connected to the wheel axle 11 and extending towards a direction parallel with the ground, a second extension section 13 pivotally connected to the first extension section 12, and a bushing 14 bridging the second extension section 13 and the steering axis 210. The first extension section 12 and the second extension section 13 may be pivotally and rotatably connected, and a gripper pattern is formed at a side opposite a pivotal joint of the first extension section 12 and the second extension section 13. Referring to FIG. 4 and FIG. 5, the anti-tilt assembly 20 includes two clamping members 21 connected to the wheel axle 11 and extending along the same direction as the first extension section 12, and two dampers 22 respectively clamped by the clamping members 21 and located closely to two sides of the first extension section 12. When the wheel axle 11 receives a torque and becomes non-parallel to the ground, i.e., when the wheels 220 at the two sides of the wheel axle 11 become tilted due to an unleveled ground, each of the dampers 22 produces a reverse torque on the first extension section 12 to counteract the force by which the wheel axle 11 tilts relative to the ground, thereby achieving the object of stabilizing the electric carrier. In an embodiment of the present invention, the dampers 22 are made of polyurethane, and are preferably in a shape of a semi-circular cylinder, a sector cylinder, or a semi-circular cylinder or a sector cylinder provided with a notch at the center. The dampers 22 are in form of claws that push tightly against two sides of the first extension section 12, respectively, and produce friction with the first extension section 12 when the wheel axle 11 is tilted to provide an anti-tilting force.

Further, an axis line of the steering axis 210 corresponds to a middle part of the wheel axle 11. In this embodiment, an included angle between the steering axis 210 and the wheel axle 11 is between 75° and 88°. Thus, the length at a front end of the vehicle body of the electric carrier is shortened to allow the electric carrier to be more compact and ready to use, and the volume of the shock-absorbent anti-tilt structure 100 may also be reduced.

Figure 3:
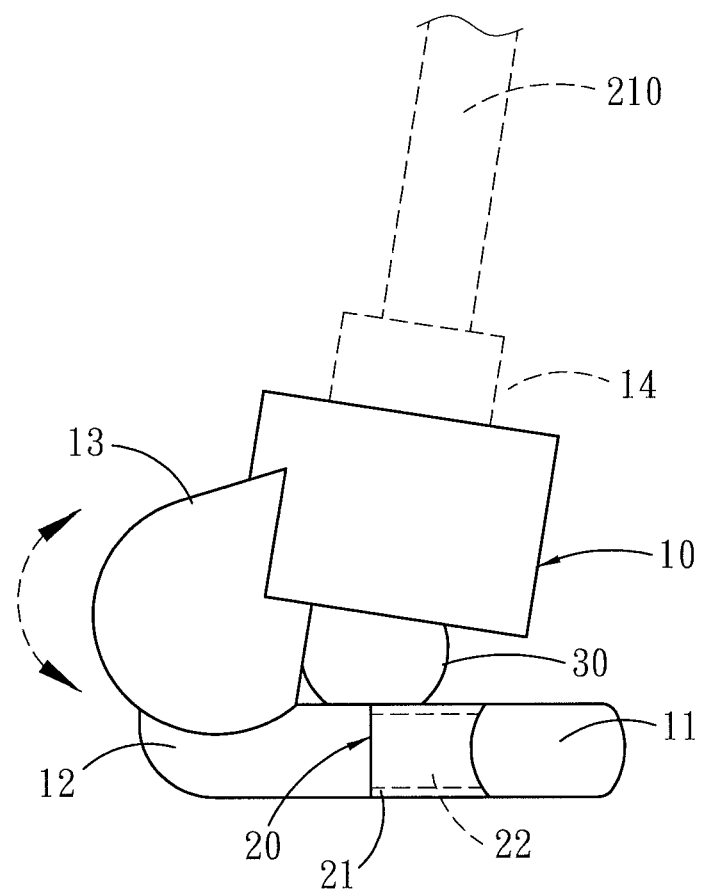
FIG. 3 is a schematic diagram of an operation according to the first embodiment of the present invention.

Referring to FIG. 3, in this embodiment, a shock absorber 30 is provided between the steering axis 210 and the wheel axle 11 and corresponding to the gripper pattern formed by the first extension section 12 and the second extension section 13. When the second extension section 13 receives a force and moves towards the wheel axle 11, the shock absorber 30 is compressed to produce a counteracting elastic force on the second extension section 13, hence achieving the object of shock absorbing. In this embodiment, the shock absorber 30 may be an elastic body made of polyurethane.

In conclusion, in the present invention, an elastic body (e.g., polyurethane) is adopted to replace the conventional technology of a mercury switch and motor-type adjustment. Thus, not only the overall weight and cost of the anti-tilt structure are reduced, but also the elastic dampers 22 are not restrained by the sensitivity of a conventional stepping motor.

What is claimed is:

1. A shock-absorbent anti-tilt structure of an electric carrier, coordinating with a steering system, the steering system comprising a steering axis and two sets of wheels linked with the steering axis, the shock-absorbent anti-tilt structure of an electric carrier comprising:

a frame, comprising a wheel axle, a first extension section pivotally connected to the wheel axle and extending towards a direction parallel with the ground, a second extension section pivotally connected to the first extension section, and a bushing bridging the second extension section and the steering axis, wherein a gripper pattern is formed at a side opposite a pivotal joint of the first extension section and the second extension section; and an anti-tilt assembly, comprising two clamping members connected to the wheel axle and extending along a same direction as the first extension section and two dampers respectively clamped by the clamping members and located closely against two sides of the first extension section, wherein each of the dampers produces a reverse torque on the first extension section when the wheel axle receives a torque and becomes unleveled with the ground.

2. The shock-absorbent anti-tilt structure of an electric carrier of claim 1, wherein an axis line of the steering axis corresponds to a middle part of the wheel axle.

3. The shock-absorbent anti-tilt structure of an electric carrier of claim 2, further comprising a shock absorber provided between the steering axis and the wheel axle and corresponding to the gripper pattern formed by the first extension section and the second extension section, wherein the shock absorber produces a counteracting force on the second extension section when the second extension section receives a force and moves towards the wheel axle.

4. The shock-absorbent anti-tilt structure of an electric carrier of claim 3, wherein the shock absorber is made of polyurethane.

5. The shock-absorbent anti-tilt structure of an electric carrier of claim 1, wherein an included angle between the steering axis and the wheel axle is between 75° and 88°.

6. The shock-absorbent anti-tilt structure of an electric carrier of claim 1, wherein the dampers are made of polyurethane, and respectively presses tightly against two sides of the first extension section.

* * * * *